(12) United States Patent
De Carvalho

(10) Patent No.: US 8,167,243 B2
(45) Date of Patent: May 1, 2012

(54) SYSTEMS AND METHODS TO PROVIDE OPTICAL ENLARGEMENT OF PASSENGER INTERIOR CABIN SPACE

(75) Inventor: Carlos Eduardo De Carvalho, São Paulo (BR)

(73) Assignee: Embraer S.A., São José dos Campos—SP (BZ)

( * ) Notice: Subject to any disclaimer, the term of this patent is extended or adjusted under 35 U.S.C. 154(b) by 692 days.

(21) Appl. No.: 12/240,677

(22) Filed: Sep. 29, 2008

(65) Prior Publication Data
US 2010/0078520 A1    Apr. 1, 2010

(51) Int. Cl.
*B64C 1/00* (2006.01)
*B64C 30/00* (2006.01)

(52) U.S. Cl. .................. 244/117 R; 244/118.5

(58) Field of Classification Search .............. 244/117 R, 244/118.1, 118.5, 119, 137.2, 137.1; 105/321, 105/315
See application file for complete search history.

(56) References Cited

U.S. PATENT DOCUMENTS

| 5,395,074 | A | 3/1995 | Hart et al. |
| 6,454,209 | B1 | 9/2002 | Bock et al. |
| 2005/0211841 | A1* | 9/2005 | Guard et al. ................. 244/119 |
| 2006/0237585 | A1* | 10/2006 | Lau et al. .................... 244/118.5 |
| 2009/0008502 | A1* | 1/2009 | Lynas .......................... 244/119 |
| 2010/0078520 | A1* | 4/2010 | De Carvalho ............. 244/118.5 |

* cited by examiner

*Primary Examiner* — David H Bollinger
(74) *Attorney, Agent, or Firm* — Nixon & Vanderhye P.C.

(57) ABSTRACT

Systems and methods achieve an optical effect of cabin enlargement of a passenger vehicle. The optical effect creates a visual impression of a higher cabin when viewed from the forward part of the cabin space looking aft, and a wider cabin space when viewed from the aft part of the cabin space looking forward. In preferred forms, a series of alternating interdigitated trapezoidal starboard and port headliner modules are disposed adjacent to the cabin headliner. The headliner modules are also preferably arcuately curved about a central elongate axis of the passenger cabin.

18 Claims, 4 Drawing Sheets

SYSTEMS AND METHODS TO PROVIDE OPTICAL ENLARGEMENT OF PASSENGER INTERIOR CABIN SPACE

FIELD

The systems and methods disclosed herein relate generally to passenger cabins, especially aircraft interior passenger cabin space.

BACKGROUND

Newer commercial passenger aircraft have interiors that are more modern, convenient, safe, and aesthetically pleasing than their older counterparts.

In general, for all classes of comfort, seats are positioned in transverse rows with respect to the longitudinal centerline of the aircraft (or the direction of travel of the plane) as well as in longitudinal columns.

To make their fleets of aircraft profitable, airlines have a dual concern. On the one hand, airlines want to carry the largest number of passengers in a given space (the aircraft passenger cabin) and on the other hand, they want to keep their customers happy and gain their loyalty by offering them the best possible services in terms of comfort and space. Thus, there is a continuous demand, especially to airlines, provide maximum comfort in high density and restrict spaces.

Headliners are commonly used in many different types of vehicles. Typically, a headliner for a vehicle is mounted within the passenger compartment of a vehicle to the vehicle roof. The headliner forms an acoustical liner for the interior of the vehicle. Headliners also add to the aesthetic appearance of the vehicle and are often manufactured with a compartment facing surface of a finish material. Various accessories, such as grab handles, dome lamps, visors, overhead stowage compartments, clothing hooks and the like can be incorporated into the headliner. See in this regard, U.S. Pat. Nos. 5,395,074 and 6,454,209 (the entirety of each being incorporated hereinto by reference). The headliner can be manufactured from a variety of relatively light materials, including fiberglass, polyester batting, compressed fiberboard and semi rigid foam.

It would of course be ideal for the interior passenger cabin to be physically as large as possible yet this desire is often constrained by the physical limits and dimensions of the vehicle. It would therefore be highly desirable if an optical effect could be achieved which, while not physically increasing the interior cabin space of a commercial passenger vehicle, could nonetheless provide a visual sensation to passengers of an enlarged cabin space. It is toward providing such a need that the systems and methods disclosed herein are directed.

SUMMARY OF EXEMPLARY EMBODIMENTS

Broadly, the disclosed systems and methods achieve an optical effect of cabin enlargement. In especially preferred embodiments, the optical effect creates a visual impression of a wider cabin when viewed from the forward part of the cabin space looking aft, and a higher cabin space when viewed from the aft part of the cabin space looking forward. In preferred forms, a series of alternating interdigitated trapezoidal starboard and port headliner modules are disposed adjacent to the cabin headliner. The headliner modules are also preferably arcuately curved about a central elongate axis of the passenger cabin.

According to some embodiments, the headliner modules are defined by alternating segments between a pair of opposite hand spirals emanating from a common perspective focal point coincident with a cross-sectional center of the passenger cabin. The optical effect of increased cabin width or height is therefore inverse in dependence upon a viewing direction within the passenger cabin. Preferably the headliner modules create an optical effect of increased cabin height when viewed from a forward part of the cabin space looking aft, and an optical effect of increased cabin width when viewed from an aft part of the cabin space looking forward.

BRIEF DESCRIPTION OF ACCOMPANYING DRAWINGS

These and other features and advantages will be better and more completely understood by referring to the following detailed description of exemplary non-limiting illustrative embodiments in conjunction with the drawings of which:

DETAILED DESCRIPTION

Figure 1:
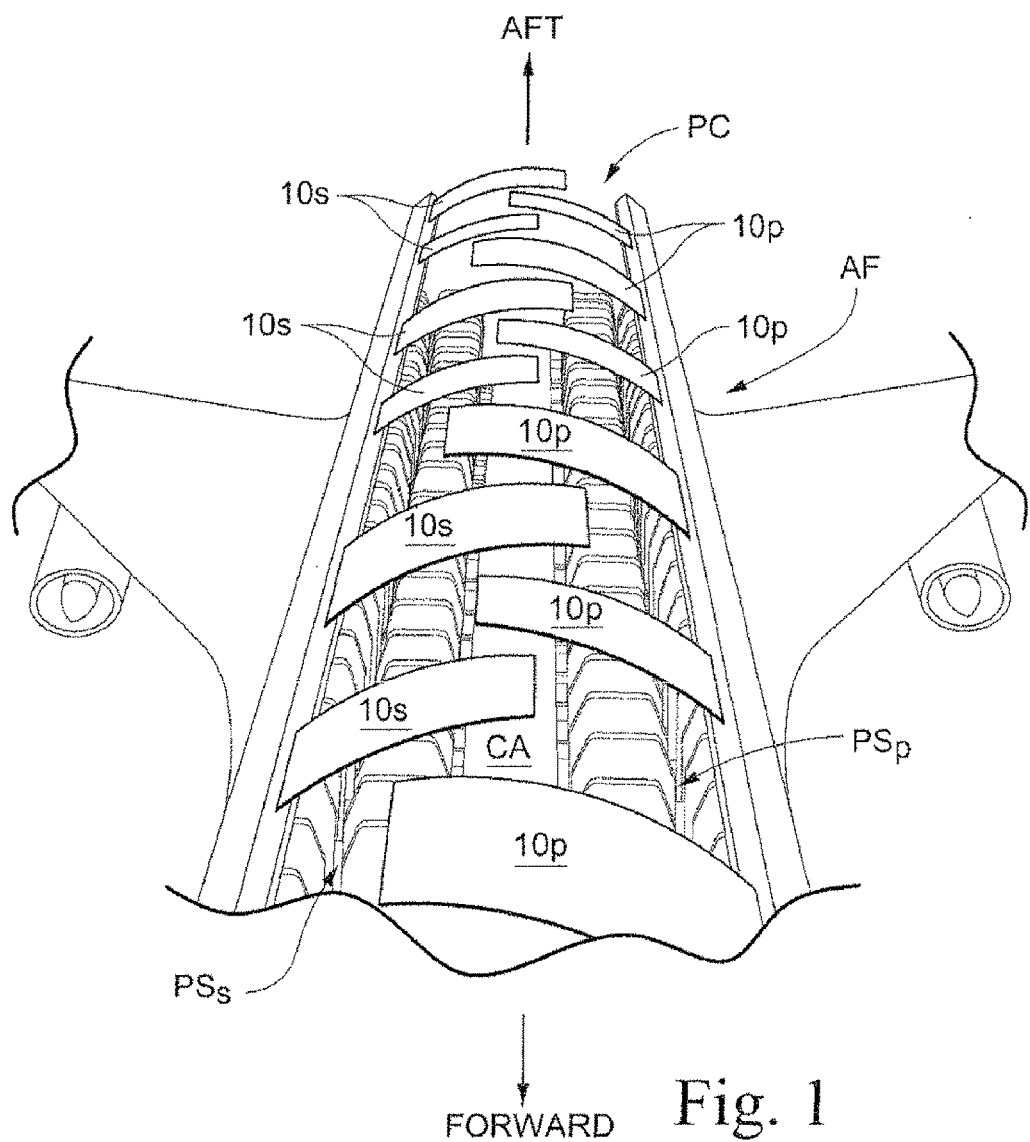
FIG. 1 is a top perspective x-ray view of an aircraft passenger cabin which includes headliner modules embodying one preferred aspect of the present invention.
Figure 2:
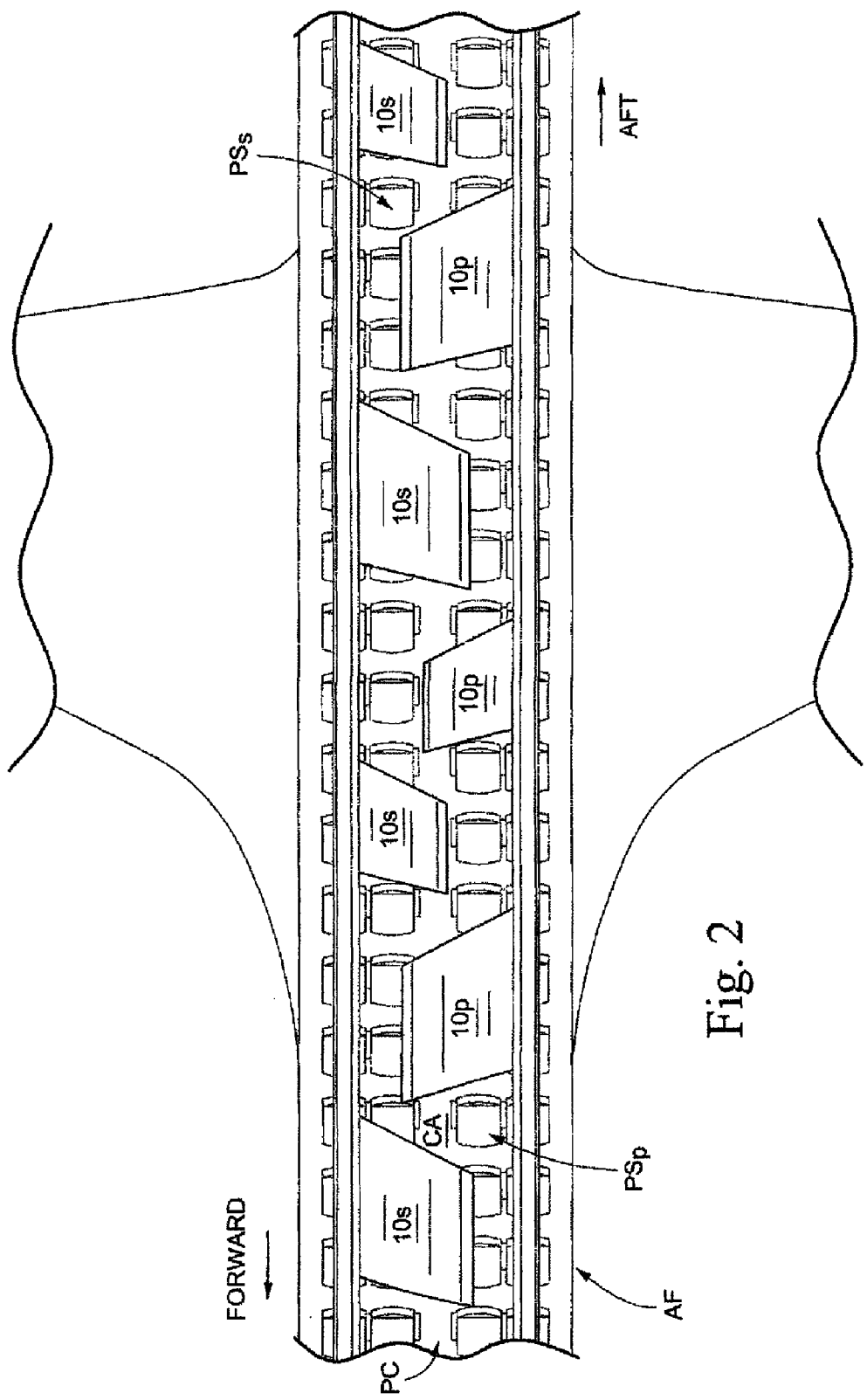
FIG. 2 is a top plan x-ray view of the aircraft passenger cabin depicted in FIG. 1.

Accompanying FIGS. 1 and 2 depict x-ray views of an aircraft fuselage AF which defines an interior passenger cabin PC which includes a center aisle CA and starboard and port rows of passenger seats $PS_s$ and $PS_p$, respectively, as determined by the forward direction of the aircraft. Thus, as depicted, FIG. 1 is a top perspective view of the aircraft fuselage AF as viewed from the forward part of the aircraft looking aft.

Figure 3:
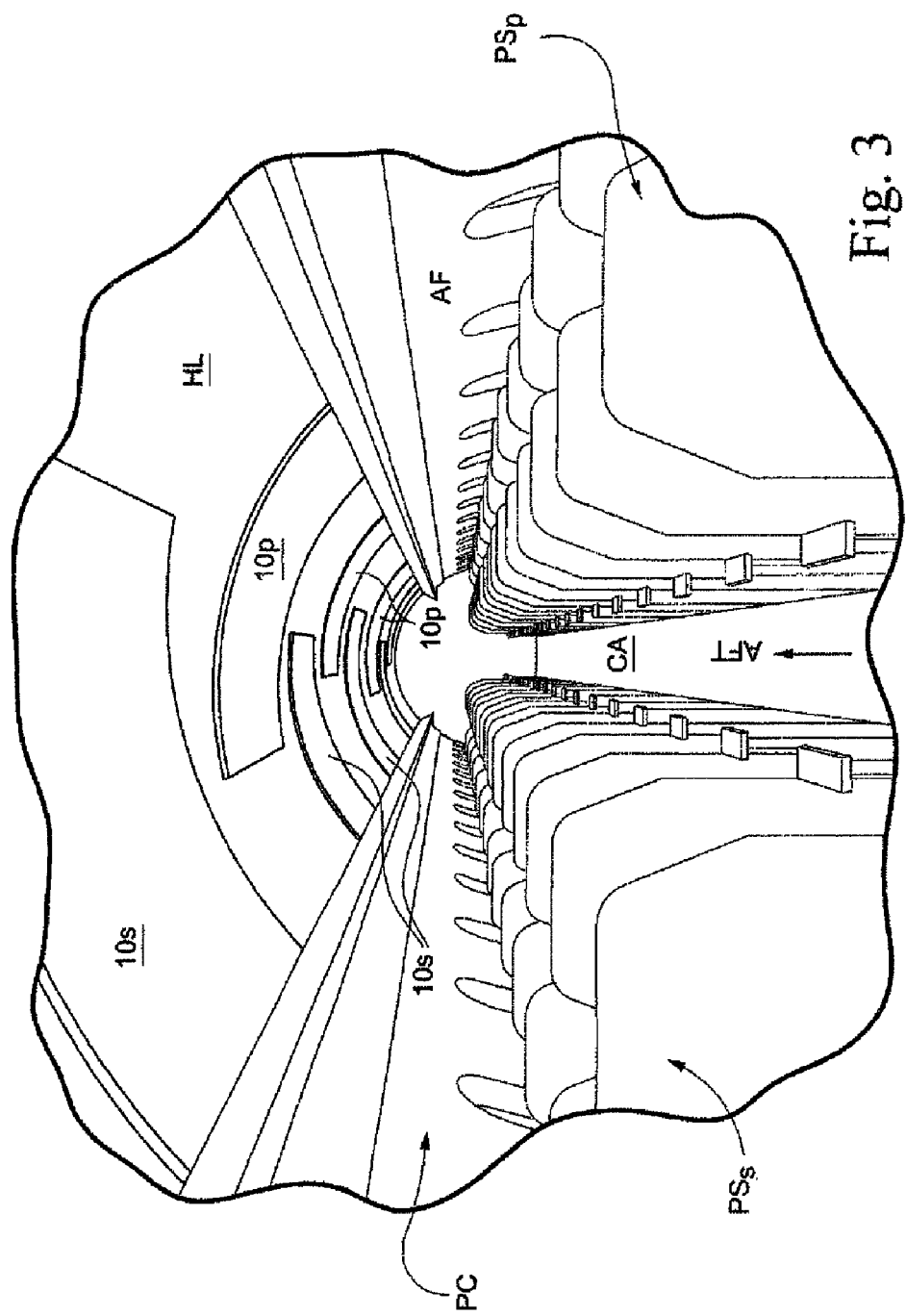
FIG. 3 is an interior perspective view of the passenger cabin depicted in FIG. 1 as viewed from the front of the cabin looking aft.
Figure 4:
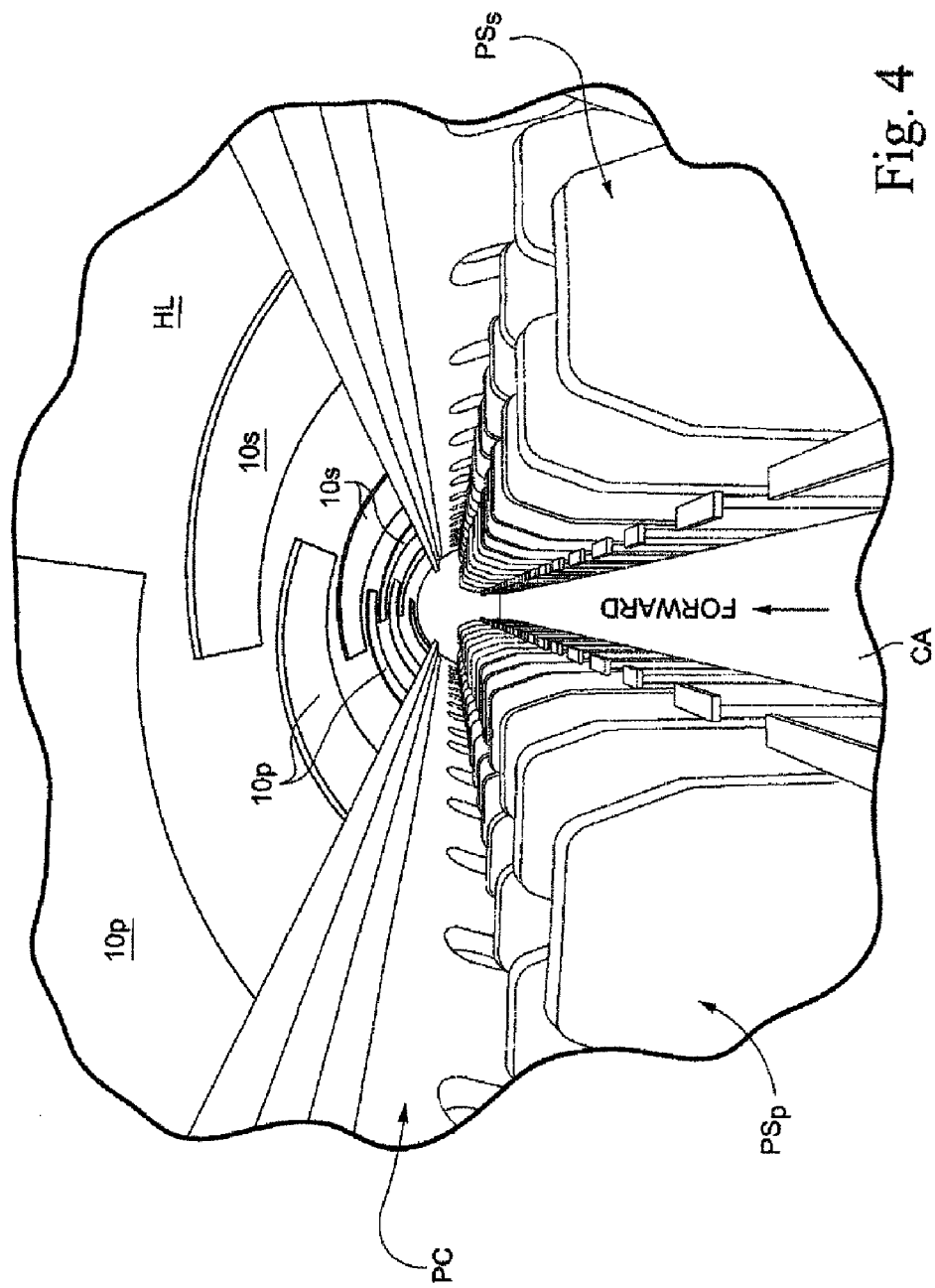
FIG. 4 is an interior perspective view of the passenger cabin depicted in FIG. 1 as viewed from the aft of the cabin looking forward.

As is shown, the passenger cabin PC is provided with a series of alternating interdigitated trapezoidal starboard and port headliner modules 10s and 10p, respectively, which are disposed adjacent to the cabin's headliner HL (not shown in FIGS. 1 and 2, but see FIGS. 3 and 4). The headliner modules 10s, 10p are also arcuately curved about the central elongate axis of the passenger cabin PC. Although trapezoidal shaped headliner modules 10s, 10p are depicted, it will be appreciated that rectangular modules could also be provided depending on the geometries of the interior passenger cabin space. Alternatively or additionally, as shown in FIG. 2, the In the embodiment shown, the trapezoidal shaped starboard and port headliner modules 10s, 10p are alternating segments defined between a pair of opposite spirals emanating from the same perspective focal point (preferably an aft perspective focal point of the passenger cabin) which is coincident with the cross-sectional center of the aircraft fuselage. Thus, in the preferred embodiment depicted, the modules 10s, 10p are trapezoidal segments defining the generatrices of opposite hand (i.e., clockwise and counterclockwise) helical surfaces. In such a manner, therefore, the shape and interdigitatation of the modules 10s, 10p create an optical illusion which is inverse depending on the point of view within the passenger cabin PC. Thus, as shown in FIG. 3, the optical illusion created by the modules 10s, 10p when viewed from the front region of the passenger cabin PC looking aft is of a relatively higher cabin space. Conversely, as shown in FIG. 4, the optical illusion created by the modules 10s, 10p when viewed from the aft region of the passenger cabin PC looking forward is of a relatively wider cabin space.

Numerous modifications and variations of the present invention are possible in light of the above teachings. However, it will be appreciated that various changes can be made without departing from the spirit and scope of the invention. Changes may be made, for example, in the contours of the headliner modules so that they match the design of other aircraft interiors. Also a variety of headliner module configurations would be required to suit specific airplane configurations. The length, width, and quantities of the headliner modules are variables that can be modified by those skilled in this art without departing from the spirit and/or scope of the present invention.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A system to provide optical enlargement of an interior cabin space of a passenger vehicle comprising a headliner in the interior cabin space, and a series of headliner modules sized and positioned within the interior cabin space to achieve an optical effect of increased cabin width or height in dependence upon viewing direction of the cabin space, wherein the headliner modules include a series of alternating interdigitated trapezoidal starboard and port headliner modules disposed adjacent to the cabin headliner.

2. The system of claim 1, wherein the headliner modules create an optical effect of increased cabin width when viewed from a forward part of the cabin space looking aft, and an optical effect of increased cabin height when viewed from an aft part of the cabin space looking forward.

3. The system of claim 1, wherein the starboard and port headliner modules are arcuately curved about a central elongate axis of the interior cabin space.

4. A system to provide optical enlargement of an interior cabin space of a passenger vehicle comprising a series of headliner modules sized and positioned within the interior cabin space to achieve an optical effect of increased cabin width or height in dependence upon viewing direction of the cabin space, wherein the headliner modules are defined by alternating segments between a pair of opposite hand spirals emanating from a common perspective focal point coincident with a cross-sectional center of the interior cabin space.

5. The system of claim 4, wherein the optical effect of increased cabin width or height is inverse in dependence upon a viewing direction within the passenger cabin.

6. The system of claim 5, wherein the headliner modules create an optical effect of increased cabin width when viewed from a forward part of the cabin space looking aft, and an optical effect of increased cabin height when viewed from an aft part of the cabin space looking forward.

7. An aircraft comprising a substantially circular cross-sectional fuselage defining a passenger cabin which establishes an interior cabin space, and a system to provide optical enlargement of the passenger cabin which comprises a cabin headliner, and a series of headliner modules sized and positioned within the interior cabin space to achieve an optical effect of increased cabin width or height in dependence upon viewing direction of the cabin space, wherein the headliner modules include a series of alternating interdigitated trapezoidal starboard and port headliner modules disposed adjacent to the cabin headliner.

8. The aircraft of claim 7, wherein the headliner modules create an optical effect of increased cabin width when viewed from a forward part of the cabin space looking aft, and an optical effect of increased cabin height when viewed from an aft part of the cabin space looking forward.

9. The aircraft of claim 7, wherein the starboard and port headliner modules are arcuately curved about a central elongate axis of the passenger cabin.

10. An aircraft comprising a substantially circular cross-sectional fuselage defining a passenger cabin which establishes an interior cabin space, and a system to provide optical enlargement of the passenger cabin which comprises a series of headliner modules sized and positioned within the interior cabin space to achieve an optical effect of increased cabin width or height in dependence upon viewing direction of the cabin space, wherein the headliner modules are defined by alternating segments between a pair of opposite hand spirals emanating from a common perspective focal point coincident with a cross-sectional center of the aircraft fuselage.

11. The aircraft of claim 10, wherein the optical effect of increased cabin width or height is inverse in dependence upon a viewing direction within the passenger cabin.

12. The aircraft of claim 11, wherein the headliner modules create an optical effect of increased cabin width when viewed from a forward part of the cabin space looking aft, and an optical effect of increased cabin height when viewed from an aft part of the cabin space looking forward.

13. A method to provide optical enlargement of an interior cabin space of a passenger vehicle comprising positioning within the interior cabin space a series of alternating interdigitated trapezoidal starboard and port headliner modules adjacent to a cabin headliner to achieve an optical effect of increased cabin width or height in dependence upon viewing direction of the cabin space.

14. The method of claim 13, wherein the headliner modules are positioned to create an optical effect of increased cabin width when viewed from a forward part of the cabin space looking aft, and an optical effect of increased cabin height when viewed from an aft part of the cabin space looking forward.

15. The method of claim 13, comprising positioning the starboard and port headliner modules so as to be arcuately curved about a central elongate axis of the interior cabin space.

16. A method to provide optical enlargement of an interior cabin space of a passenger vehicle comprising positioning in the interior cabin space a series of headliner modules which are defined by alternating segments between a pair of opposite hand spirals emanating from a common perspective focal point coincident with a cross-sectional center of the interior cabin space to achieve an optical effect of increased cabin width or height in dependence upon viewing direction of the cabin space.

17. The method of claim 16, wherein the headliner modules create an optical effect of increased cabin width or height which is inverse in dependence upon a viewing direction within the passenger cabin.

18. The method of claim 17, wherein the headliner modules create an optical effect of increased cabin width when viewed from a forward part of the cabin space looking aft, and an optical effect of increased cabin height when viewed from an aft part of the cabin space looking forward.

* * * * *